United States Patent [19]

Richards et al.

[11] Patent Number: 5,305,577

[45] Date of Patent: * Apr. 26, 1994

[54] FIRE-RESISTANT STRUCTURE CONTAINING GYPSUM FIBERBOARD

[75] Inventors: Turner W. Richards, Conyers; Hubert C. Francis, Lithonia; George F. Fowler, Norcross, all of Ga.

[73] Assignee: Georgia-Pacific Corporation, Atlanta, Ga.

[*] Notice: The portion of the term of this patent subsequent to Dec. 15, 2009 has been disclaimed.

[21] Appl. No.: 975,900

[22] Filed: Nov. 10, 1992

Related U.S. Application Data

[63] Continuation of Ser. No. 614,622, Nov. 16, 1990, which is a continuation-in-part of Ser. No. 420,362, Oct. 12, 1989, Pat. No. 5,171,366.

[51] Int. Cl.$^5$ .............................................. E05D 7/00
[52] U.S. Cl. ........................................ 52/799; 52/232; 52/309.17; 52/455; 428/537.7; 428/218
[58] Field of Search ................ 428/920, 537.7, 218; 52/232, 309.17, 799, 455

[56] References Cited

U.S. PATENT DOCUMENTS

| | | |
|---|---|---|
| 2,076,349 | 4/1937 | Porter et al. . |
| 2,322,194 | 6/1943 | King . |
| 2,882,175 | 4/1959 | Bailly . |
| 2,913,308 | 11/1959 | Dailey . |
| 3,376,147 | 4/1968 | Dean . |
| 3,390,003 | 6/1968 | Cooper . |
| 3,570,208 | 3/1971 | Nikai et al. . |
| 3,616,173 | 10/1971 | Green et al. . |
| 3,839,059 | 10/1974 | Rothfelder et al. . |
| 3,951,735 | 4/1976 | Kondo et al. . |
| 4,045,268 | 8/1977 | Geschwender . |
| 4,047,962 | 9/1977 | Copeland . |
| 4,127,628 | 11/1978 | Uchida et al. . |
| 4,159,302 | 6/1979 | Greve et al. . |
| 4,174,230 | 11/1979 | Hashimoto et al. . |
| 4,214,027 | 6/1980 | Knauf et al. . |
| 4,222,984 | 9/1980 | Ladwig . |
| 4,239,716 | 12/1980 | Ishida et al. . |
| 4,252,568 | 2/1981 | Bounini . |
| 4,328,178 | 5/1982 | Kossatz . |
| 4,343,127 | 8/1982 | Greve et al. . |
| 4,557,973 | 12/1985 | Ali . |
| 4,645,548 | 2/1987 | Take et al. . |
| 4,734,163 | 3/1988 | Eberhardt et al. . |
| 4,748,771 | 6/1988 | Lehnert et al. ..................... 428/920 |
| 4,810,569 | 3/1989 | Lehnert et al. . |
| 4,811,538 | 3/1989 | Lehnert et al. ........................ 52/232 |
| 4,840,688 | 6/1989 | Vogt . |
| 5,171,366 | 12/1992 | Richards et al. ..................... 106/772 |

FOREIGN PATENT DOCUMENTS

2365161 7/1975 Fed. Rep. of Germany .

(List continued on next page.)

OTHER PUBLICATIONS

Proceedings of the Second International Inorganic Bonded Wood and Fiber Composite Materials Conference, Furman, H., "Marketing Opportunities for Gypsum Fiberboard," 1991, pp. 133–135.

(List continued on next page.)

*Primary Examiner*—Carl D. Friedman
*Assistant Examiner*—Wynn E. Wood
*Attorney, Agent, or Firm*—Synnestvedt & Lechner

[57] ABSTRACT

Fire-resistant structures are provided having at least a 20 minute ASTM E-152 fire test rating. The structures include a core having a gypsum-containing composition and a density of at least about 60 lbs/ft, a flexural strength of at least 30 lbs (½ inch thick material), and a screw-holding capacity of at least about 400 lbs. The gypsum-containing composition further contains a substantially uniform distribution of solids including about 65 wt. % to about 90 wt. % set gypsum dihydrate, about 7 wt. % to about 30 wt. % paper fiber, and about 1.5 wt. % to about 35 wt. % of one or more performance boosters selected from inorganic fiber, clay, vermiculate, and binder polymer.

42 Claims, 8 Drawing Sheets

FOREIGN PATENT DOCUMENTS

| | | |
|---|---|---|
| 84216 | 7/1977 | Japan . |
| 92836 | 8/1978 | Japan . |
| 134814 | 11/1978 | Japan . |
| 106559 | 7/1982 | Japan . |
| 165615 | 9/1984 | Japan . |
| 171261 | 9/1985 | Japan . |
| 1217840 | 3/1986 | U.S.S.R. . |
| 1536663 | 12/1978 | United Kingdom . |
| 2053184A | 2/1981 | United Kingdom . |

OTHER PUBLICATIONS

Sattler et al., "Gypsum-Bonded Particleboards and Fiberboards," *Fiber and Particleboards Bonded with Inorganic Binders*, pp. 19-25, (presented orally Oct. 24-26, 1988, copyright 1989).

Bahner et al., "New Equipment for Forming Gypsum and Cement Fiberboards from an Aqueous Slurry," *Fiber and Particleboards Bonded with Inorganic Binders*, pp. 94-97, (presented orally Oct. 24-26, 1988, copyright 1989).

R. Miller, "The Wurtex System for Gypsum Fiberboard," *Fiber and Particleboards Bonded with Inorganic Binders*, pp. 103-106, (presented orally Oct. 24-26, 1988, copyright 1989).

Louisiana-Pacific Trade Literature for Fiberbond, fiber gypsum wallboard, (Apr., 1991).

Proceedings of the Second International Inorganic Bonded Wood and Fiber Composite Materials Conference, Kraemer and Lempfer, "Gypsum Fiberboard—History and Outlook," 1991, pp. 77-84.

Proceedings of the Second International Inorganic Bonded Wood and Fiber Composite Materials Conference, Natus, G., "Gypsum Fiberboard Production in Nova Scotia, Canada," 1991, pp. 85-87.

Proceedings of the Second International Inorganic Bonded Wood and Fiber Composite Materials Conference, Godfrey, J., "Experiences in Gypsonite Manufacturing," 1991, pp. 88-93.

Proceedings of the Second International Inorganic Bonded Wood and Fiber Composite Materials Conference, Takahashi, Watanabe, Koga and Kaneko, "Gypsum-Cellulose Fiberboard by the Hatschek Process," 1991, p. 94.

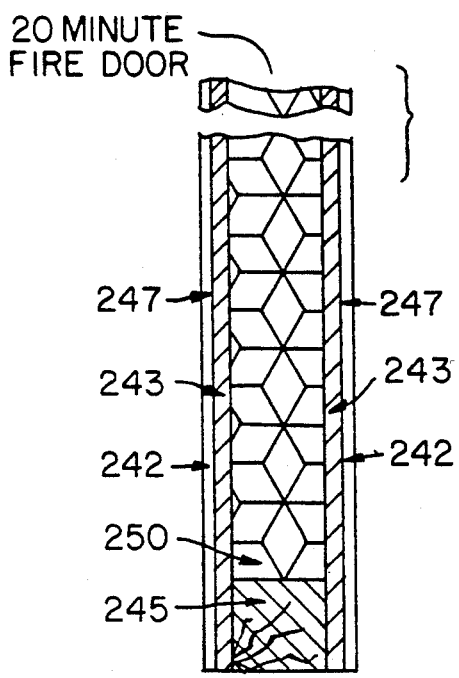
FIG. 9 — 20 MINUTE FIRE DOOR
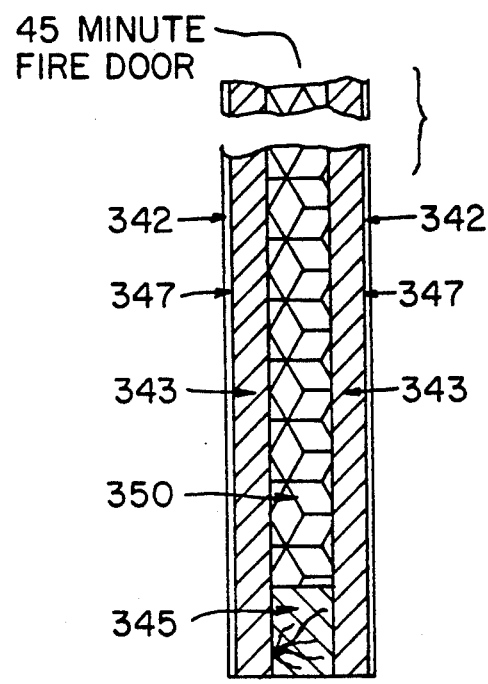
FIG. 10 — 45 MINUTE FIRE DOOR
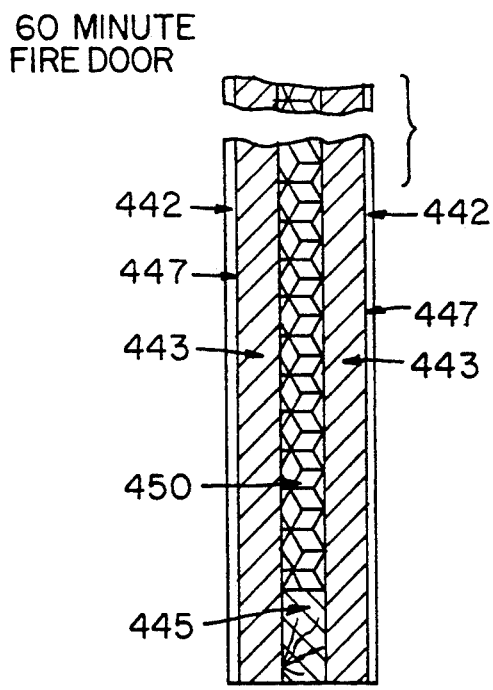
FIG. 11 — 60 MINUTE FIRE DOOR
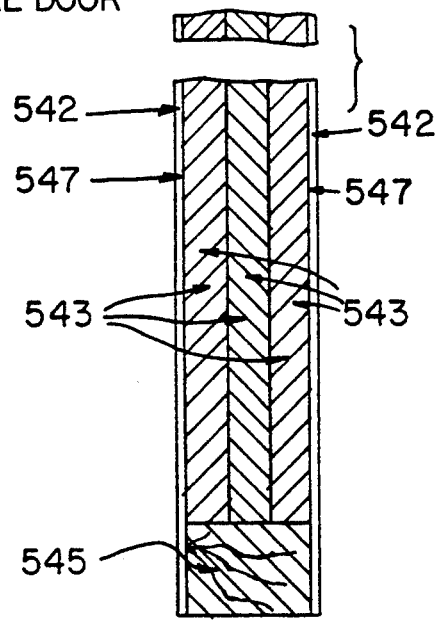
FIG. 12 — 90 MINUTE FIRE DOOR

FIRE-RESISTANT STRUCTURE CONTAINING GYPSUM FIBERBOARD

CROSS-REFERENCE TO RELATED APPLICATION

This is a continuation application of application Ser. No. 614,622, filed Nov. 16, 1990 (abandoned), which in turn is a continuation-in-part application of application Ser. No. 420,362, filed Oct. 12, 1989 now abandoned, now U.S. Pat. No. 4,171,366.

FIELD OF THE INVENTION

This invention relates generally to fire-retardant structures suitable for use in cores of fire doors, and more particularly, to mineral-containing compositions for providing superior fire resistance and economical fire door constructions.

BACKGROUND OF THE INVENTION

Fire doors, as used in residential, commercial, and industrial applications, are typically employed in conjunction with fire walls to provide fire protection between different zones of a structure, and particularly to isolate high fire risk areas of a building from the remainder of the structure, such as the garage from the living quarters of a dwelling. Fire doors may be constructed in both panel or flush-type configurations. They often include facings on the two major planar surfaces and a core which may be solid or include some hollow space. Edge banding is often provided around the door periphery for structural reasons.

Fire doors usually are not capable of indefinitely withstanding the high temperature conditions of a fire, but rather, are designed to maintain the integrity of the fire wall for a limited time to permit the occupants of a building to escape and to delay the spread of the fire until fire control equipment can be brought to the scene. Various tests have been devised for determining the reliability of fire doors which are based, in part, on such factors as the time that a given door can withstand a certain temperature while maintaining its integrity. One such test is the ASTM E-152 fire test, which requires a door to maintain its integrity for periods ranging up to 1.5 hours while withstanding progressively higher temperatures within the range of 1750° F. to 1800° F. and the erosive effects of a high pressure fire hose at the conclusion of the fire exposure.

Considerations in fire door design, in addition to retarding the advance of a fire, include the cost of raw materials and the cost of fabrication. Furthermore, the weight of the door is important, both from the standpoint of ease in handling and the cost of transportation. The strength of the door is also a significant factor, since fire doors must pass the previously noted fire and water stream test as well as have the requisite structural strength to withstand normal use and abuse. Finally, fire doors must provide support and split-resistance in localized areas where hinges, knobs, and locks are mounted.

Fire-resistant doors have, in the past, been made in a variety of constructions utilizing a number of different materials, including wood, metal and mineral materials. Early forms of fire doors simply consisted of wooden cores faced with metal sheeting. Although wood in ample thicknesses is an effective fire and heat retardant, doors of this construction tend to be heavy and are expensive to fabricate and transport.

It has also been proposed to make fire doors having a core comprising particles of expanded perlite which are bound together with one or more binders including gypsum, cement and inorganic adhesive material. In order to provide sufficient strength, particularly to withstand handling of the core during manufacture, the core is compressed to compact the mixture to a relatively high density, resulting in a heavy door.

Other fire doors have included conventional gypsum wallboard panels as a core material. However, conventional wallboard does not have sufficient structural integrity to withstand a 90 minute fire and hose stream test and would therefore be unsuitable in many fire door applications. Furthermore, because of the lack of appreciable flexural strength, internal wooden structural members such as rails or mullions have been found necessary to support and strengthen wallboard panels. The need for such reinforcing elements increases the cost of materials and assembly of such doors.

The art has been replete with numerous examples of fire door constructions, some of which have been commercially exploited. See Greve and Richards, U.S. Pat. No. 4,159,302, ('302), issued Jun. 26, 1979; Lehnert et al., U.S. Pat. No. 4,811,538, ('538), issued Mar. 14, 1989; and Lehnert et al., U.S. Pat. No. 4,748,771, ('771), issued Jun. 7, 1988, all of which are hereby incorporated by reference.

Greve and Richards '302 discloses a set gypsum-containing composition which is especially useful as a core in a solid core fire door. Lehnert '538 describes a fire door capable of withstanding a 20 minute ASTM E-152 fire test and which is partially hollow but has a core of set gypsum faced with fibrous mats. Lehnert '771 discloses set gypsum-containing edge banding for use in fire doors for obtaining a successful 90 minute ASTM E-152 fire rating. This edge banding system contains a laminated tripartite construction which includes an inner strip comprising a cast gypsum mixture, an intermediate fiber-reinforced plastic strip, and an outer strip of natural wood. This edge banding is surprisingly complex and correspondingly expensive. The complexity is necessary, at least in part, because the combination of the gypsum and wood strips alone does not provide the screw-holding capacity required for hinges, latch mechanism, etc. The thin plastic strip is therefore necessary to provide structural support for these attachments The gypsum strip included in this edge banding construction includes gypsum, glass fiber, raw vermiculite, and clay, together with a small amount of paper fiber (less than 2% by weight), wood chips, and a resin binder, which may be polyvinyl acetate.

While in the main, commercial fire-resistant materials are known to possess certain mechanical and fire-resistant properties which are acceptable in fire doors, they often require expensive, cumbersome, or potentially hazardous additives to achieve those properties. Thus, there is a need for a composition and structure which includes safe and inexpensive components from which superior fire doors and panels can be made.

SUMMARY OF THE INVENTION

This invention provides fire-resistant structures suitable for use in fire door applications The structures have at least a 20 minute ASTM E-152 fire test rating and include a core comprising a gypsum fiberboard composition having a density of at least about 60 lbs/ft$^3$, a flexural strength of at least 30 lbs (¼ inch thick material), and a screw-holding capacity of at least about 400 lbs. The composition of this structure contains a substantially uniform distribution of solids including about 65 wt. % to about 90 wt. % set gypsum dihydrate, about 7 wt. % to about 30 wt. % paper fiber, and about 1.5 wt. % to about 35 wt. % of one or more performance boosters selected from inorganic fiber, clay, vermiculite, and binder polymer.

Accordingly, practical and economical fire-resistant structures are provided which have excellent fire-resistance characteristics, as well as important and desirable environmental benefits. The gypsum fiberboard of this invention is both safe and effective for use in structural elements subject to high temperatures. It can be produced relatively inexpensively and can be incorporated into fire doors without rendering them excessively heavy. The gypsum fiberboards of the present invention can include scrap or waste materials, which can provide further cost incentives to manufacturers, as well as satisfy a current need for the recycling of building debris and flue slag.

In another aspect of this invention, gypsum fiberboards are employed in a variety of economical constructions for obtaining multiple fire ratings. Fire door designs are provided for obtaining 20 minute, 45 minute, 60 minute, and 90 minute ASTM E-152 fire test labels. The disclosed gypsum fiberboards can be separated by spacing means, such as paper-containing honeycomb-like structures, for uniformly supporting the fiberboards and for producing an overall light weight core. This invention therefore not only provides economical fire doors, but also a flexible manufacturing method which is capable of producing multiple layers of preferred fiberboard formulations in varying thicknesses for different fire rating requirements.

The fiberboard structures and door cores of this invention preferably do not include paper facing sheets, such as those normally employed with ordinary paper-surfaced gypsum wallboard. In wallboard composite fire doors, the paper facings of two or more wallboards are usually adhesively bonded together for laminating the different components of the core together. Paper facing, however, is very susceptible to humidity changes in the atmosphere, which can adversely affect the laminated components of the core. Additionally, during a fire, water driven off from the chemically combined gypsum, weakens the paper, causing delamination and premature failure. Paper facing is also known to char away, leaving little, if any, adhesive bonds between the layers of a composite core.

Since the bonded fiberboard layers of this invention preferably do not have paper facing sheets, they are more stable throughout a wide range of changing humidities, making them attractive in even the most damp applications Moreover, the intimate contact between the paper fibers and set gypsum in the composition of this invention can withstand a far higher temperature before evidencing deterioration of the adhesive bonds between the gypsum fiberboard layers than is the case for delamination of adhesively secured wallboards.

The unfaced gypsum fiberboards of this invention also provide a unique advantage over pressed perlite cores since less glue is required during lay up due to the lower surface porosity of the fiberboard structure Smaller glue requirements lower manufacturing costs and provide a more economical fire door.

A further advantage of this invention is the simplification and structural improvement of the disclosed edge banding versus tripartite and other laminated systems of the prior art. The gypsum fiberboard structures and doors of this invention do not require any particular edge system. Their composition alone can provide superior split resistance and screw-holding capacity. These fiberboards can also be readily machined for providing relief designs, such as those found in panel doors.

STATEMENT OF OBJECTS

It is therefore an object of this invention to provide a fire-resistant fiberboard structure which can be adapted to provide multiple fire ratings It is another object of this invention to provide a fiberboard core which is stable throughout a wide range of humidity and temperature changes and which requires less adhesive during lamination.

It is a further object of this invention to provide fire door constructions which include a gypsum fiberboard core, do not require a supplemental edge banding system, and can be machinable into various configurations.

With these and other objects in view, this invention resides in the novel construction, combination, arrangement of parts, and methods substantially as hereinafter described, and more particularly defined, by the attached claims.

BRIEF DESCRIPTION OF THE DRAWINGS

The accompanying drawings illustrate preferred embodiments of the invention as well as other information pertinent to the disclosure, and in which:

FIG. 9: is a partial cross-sectional view of a preferred 20 minute fire door embodiment;

FIG. 10: is a partial cross-sectional view of a preferred 45 minute fire door embodiment;

FIG. 11: is a partial cross-sectional view of a preferred 60 minute fire door embodiment;

FIG. 12: is a partial cross-sectional view of a preferred 90 minute fire door embodiment.

DETAILED DESCRIPTION OF THE INVENTION

Figure 1:
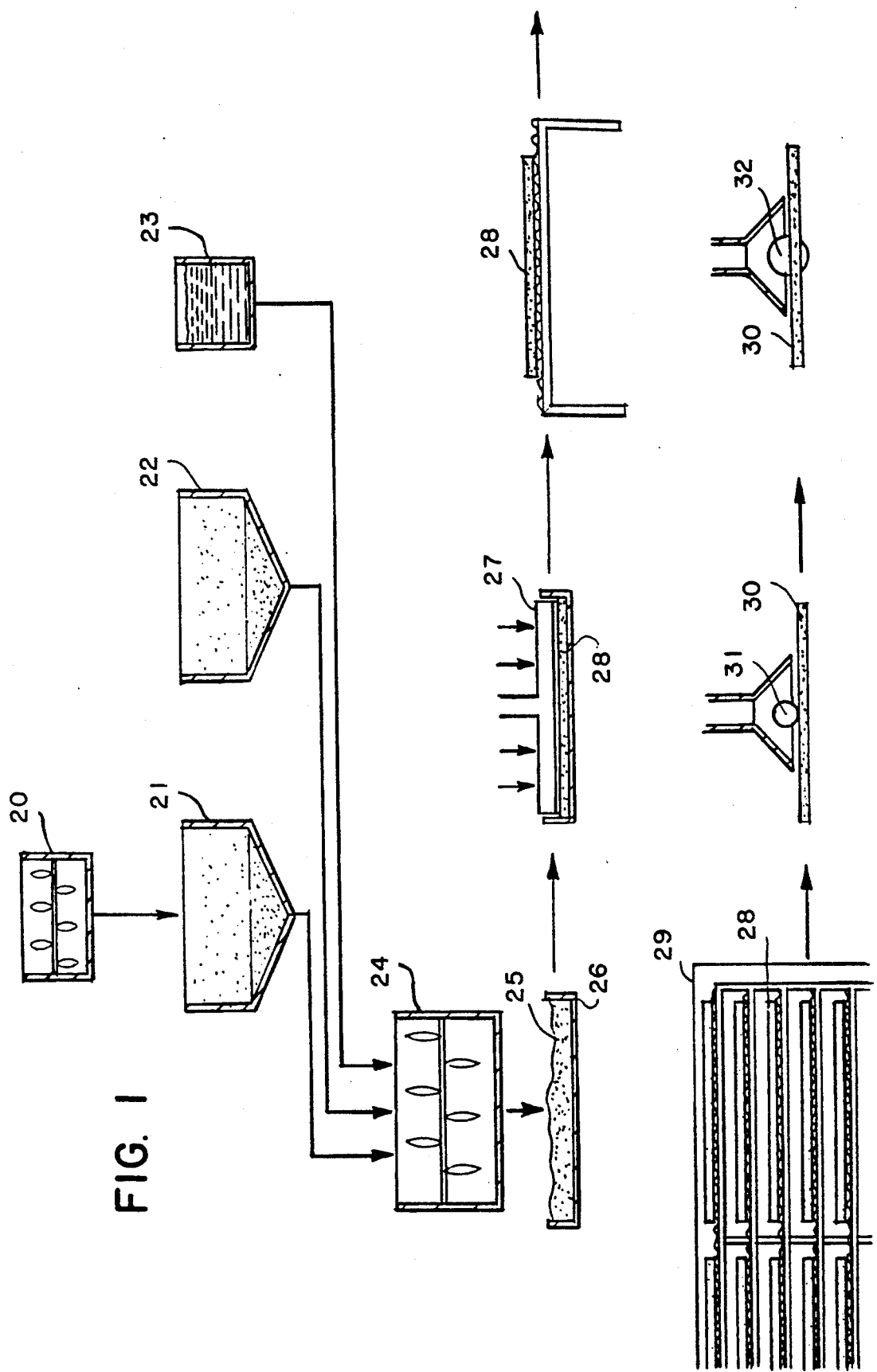
FIG. 1: is a flow diagram which illustrates the process of this invention by which gypsum-containing fiberboards are made.

Fire-resistant structures and specific fire door constructions are provided by this invention which include one or more gypsum fiberboards having a density of at least about 60 lbs/ft$^3$, a flexural strength of at least about 30 lbs (½ inch thick material), and a screw-holding capacity, defined below, of at least about 400 lbs. These fiberboards contain about 65 wt. % to about 90 wt. % set gypsum dihydrate and about 7 wt. % to about 30 wt. % paper fiber and about 1.5 wt. % to about 35 wt. % performance booster. When used as a core in fire door applications, this composition has at least a 20 minute ASTM E-152 fire test rating.

In a more specific embodiment of this invention, a 20 minute fire door is provided which includes at least a pair of unfaced gypsum fiberboard panels containing a composition comprising about 75 wt. % to about 90 wt. % set gypsum dihydrate, about 10 wt. % to about 17 wt. % paper fiber, and about 1.5 wt. % to about 35 wt. % of a performance booster selected from inorganic fiber, clay, vermiculite, and binder polymer. The gypsum fiberboard panels of this embodiment have a flexural strength of at least about 30 lbs (½ inch thick material), a screw-holding capacity of at least 400 lbs, and a wood-like veneer disposed substantially over the core. Other fire doors are provided by this invention which will pass at least 45, 60, and 90 minute ASTM E-152 fire tests.

FIBERBOARD CONSTRUCTION

The gypsum-containing fiberboard layers of this invention should be fire resistant yet possess a high degree of structural integrity. They must provide superior screw-holding for attached door hardware and have exceptional overall strength.

The preferred fiberboard panels of this invention have a density of at least about 60 lbs/ft$^3$, a flexural strength of at least 30 lbs (½ inch thick material), and a screw-holding capacity, measured as defined hereinafter, of at least about 400 lbs. The fiberboard panels do not require a paper facing, which is desirably absent to promote fire and water resistance properties. The composition of the preferred fiberboard panels is a uniform distribution of solids, which includes by weight, about 65% to about 90% set gypsum dihydrate, about 7% to about 30% cellulosic fiber, and preferably about 1.5% to about 35% of one or more performance boosters selected from inorganic fiber, clay, vermiculite, and binder polymer.

One of the essential constituents of the gypsum-containing fiberboard panels of the present invention is calcium sulfate dihydrate. This constituent is derived from the hydration of any form of calcium sulfate which is preferably in non-fibrous form and which is capable of reacting with water to form set gypsum, that is, calcium sulfate dihydrate. Thus, the calcium sulfate can be in anhydrous form or in the hemihydrate form. It is believed that the hemihydrate form of calcium sulfate will be used most widely. Of the "alpha" and "beta" forms of the hemihydrate, use of the latter is preferred. The hemihydrate can be produced from the naturally-occurring gypsum mineral by heating, or calcining, the dihydrate.

For many applications, it is not important to inquire into the crystalline form of the hemihydrate; however, with respect to fiberboard panels of this invention, a preference is made. It is known that calcium sulfate hemihydrate can exist in two different crystalline forms, namely a non-fibrous form and a fibrous form, for example, elongated needles, such as the fibrous alpha-calcium sulfate hemihydrate disclosed in U.S. Pat. No. 4,239,716, which is hereby incorporated by reference. In the practice of this invention, there is used a non-fibrous form of calcium sulfate capable of reacting with water to form set gypsum. It should be understood, however, that a minor amount of a fibrous form of gypsum can be used as an optional constituent.

As mentioned above, one of the advantages of the present invention is that waste-type materials can be used in fabricating the fiberboard panels. For example, there can be used as the source of the calcium sulfate the material known as "desulfurized by-product gypsum" which is produced by the desulfurization of flue gas. Another example of a waste- or scrap-type material that can be used in the practice of the present invention is scrap gypsum wallboard, which can be used as a source of both calcium sulfate and the paper constituent of the fiberboard. For this purpose, scrap paper-faced gypsum wallboard can be ground into suitably small particles which are processed in water under pressure and in the presence of a crystal modifier to form non-fibrous calcium sulfate hemihydrate. Scrap gypsum wallboard can also be transformed into a suitable material for use in the practice of the present invention by grinding and calcining it at atmospheric pressure. Sufficient water can be used to form the desired pulp-type material from which the product is conveniently made. This invention can employ any of the above-disclosed individual sources of calcium sulfate, but a mixture of the different sources of calcium sulfate can also be used.

In the use of an aqueous dispersion to make the gypsum-containing fiberboard panels the non-fibrous calcium sulfate generally will comprise between about 53% and about 78% by weight of the total solids, preferably between about 55% and about 70% by weight, depending upon the specific application for the resultant building material. For example, in a building board to be employed as edge banding in a fire door, the non-fibrous calcium sulfate content of the dispersion may be in the range of about 54% to about 62% by weight of the solids. On the other hand, in a building panel to be used as the facing on a fire door, the calcium sulfate content of the dispersion may lie between about 60% and about 80% by weight of the solids.

The gypsum dihydrate content of the preferred fiberboard panels of this invention will be approximately 18.5% greater than the non-fibrous calcium sulfate content of the compositions from which they are made, the difference representing the added water of hydration in the set gypsum dihydrate. That is, by weight, the set gypsum will preferably comprise between about 65% and about 90%, preferably between about 70% and about 85% of the overall set composition. In a building board for use as edge banding in a fire door, the set gypsum dihydrate may comprise between about 68% and about 78% by weight. In a building panel intended for use in fire door facings, the set gypsum may comprise between about 75% and about 90% by weight.

The compositions of the preferred fiberboard panels of this invention also employ a substantial amount of cellulosic fiber. Cellulosic fiber includes the fibrous component of plants, such as cotton, linen, and flax, for example. Among the various sources of cellulosic fiber, paper stock is conveniently employed. That is, the solid component involved in each of the aforesaid aspects of the invention preferably includes by weight about 7% to about 30% paper fiber, more preferably between about 10% and about 17%. Building materials intended for use in various specific products may contain somewhat different amounts of paper fiber. For example, a building board intended for use as edge banding in a fire door may contain about 15% paper fiber by weight, while a panel intended to be used as fire door facing contain somewhat less, e.g., about 12% or 13%. The may presence of the paper fiber makes it possible to produce building materials having good physical characteristics such as flexural strength, screw and nail holding, and surface hardness without having any separate surfacing membrane such as the paper facing on conventional gypsum wallboard.

The paper fiber can be derived from either virgin paper stock, or previously used, waste paper stock can be employed. The source of the paper can be wood, cotton or linen rags, straw, etc., the origin or history of the paper not being important factors. The paper may be a product of the sulfite process, the sulfate (Kraft paper) process, or other processes. Among the types of paper stock that have been successfully employed are virgin and brown Kraft papers, and especially, newsprint. Waste newspaper provides very satisfactory results, is inexpensive, and its use helps to overcome an environmental pollution problem. And, as mentioned hereinabove, the source of the paper stock can include the paper of ground paper-faced gypsum wallboard.

Fiberboard panels and boards within the scope of this invention desirably and preferably include one or more performance boosting additives, their specific nature depending to some extent on the intended utility of the final product. In almost every case, there will be desirably used one or more defoaming agents, dispersants, and accelerators, ingredients which are well known in the art and are employed at low concentration levels, generally each at less than about 1% by weight of the solids. In the aggregate, the performance booster generally will comprise about 1.5% to about 35% by weight of the solids and will preferably be selected from inorganic fiber, clay, vermiculite, and binder polymer.

Inorganic fiber, as that term is employed herein, includes glass textile fiber and mineral wool. These latter terms are defined in U.S. Pat. No. 4,557,973, and those definitions are incorporated herein by reference. Briefly, the term "mineral wool" means glass or other mineral fibers prepared by attenuating a melt of glass, basalt, blast furnace slag or other vitreous mineral composition from the face of a heated centrifugal rotor or the like. This process is in contrast to that used to produce textile fibers, where the melt is drawn through an orifice. An especially useful and readily available type of mineral wool is glass wool as found in glass wool insulation material. Glass textile fiber and glass wool, jointly or severally, are referred to herein as "siliceous fiber." As employed in this invention, the glass textile fiber generally will be chopped, e.g., the fibers may be about ½ inch long.

The fiberboards of this invention preferably include siliceous fiber. Siliceous fiber improves the fire resistance of the building materials and other products of this invention, apparently by decreasing the tendency of the gypsum construction to crack under thermal stress The siliceous fiber preferably comprises up to about 7% by weight and may include glass textile fiber and, in addition, glass wool, depending upon the specific product. For example, a building board intended for use as edge banding in a fire door preferably includes up to about 7% by weight glass textile fiber, most preferably about 2% by weight glass textile fiber, glass wool being unnecessary. However, a building panel intended to be used as facing on a fire door preferably includes about 0.8% to about 2% siliceous fiber, most preferably a combination of about 0.4% chopped glass textile fiber and about 0.5% to about 1.5% glass wool by weight.

The performance booster may also include either clay or vermiculite, or both, especially if the intended board or panel requires excellent fire resistance Both of these materials may be present in amounts up to about 15.0% by weight, preferably up to about 6%, and more preferably about 3% to about 4% by weight of the solids. The clay to be employed will generally be kaolin clay, which is effective to control the shrinkage of the gypsum-containing construction under extreme heat, for example, ASP 70 Kaolin clay sold by Minerals and Chemicals Philip Corporation. The vermiculite should be raw, or unexpanded vermiculite, which swells when heated, helping to control shrinkage of the construction and possible cracking. The requirement for the presence of these materials depends somewhat on the intended use for the final product and may not be necessary in, e.g., a panel intended for use as facings in a fire door.

The composition of the preferred fiberboards of this invention, as well as the construction techniques for fabricating fire door cores by adhesively bonding the fiberboards together or to paper honeycombs, may also employ binder polymer. The binder polymer affects the physical properties of the fiberboard layers, especially their flexural strength, and also permits good fastener retention at lower density. Furthermore, the binder polymer improves the surface characteristics of the board, panel, or door, such as smoothing the surface and making it easier to finish.

The binder polymer, when present, may comprise up to about 15% by weight of the solids, but preferably about 1% to about 3% by weight. A number of different polymeric materials may be employed as binder polymer, including homopolymers, such as poly(vinyl acetate) and polyacrylate, as well as copolymers, such as poly(ethylene)-co-(vinyl chloride), poly(styrene)-co-(butadiene), and poly(vinyl acetate)-co-(methyl acrylate). Among the various binder polymer possibilities, esters of poly(vinyl alcohol) are especially effective, and poly(vinyl acetate) homopolymer is preferred. It is also convenient in most cases to introduce the binder polymer as an aqueous emulsion, many of which are commercially available.

In selecting the binder polymer, thermoplastic resins are preferred since they tend to form a tough, forgiving film, rather than a brittle film, or one which is soft and has a very low tensile strength when applied for joining the surfaces of the fiberboards, stiles, and rails. Thermoplastic resins are also preferred since the heat required to set a thermosetting resin tends to calcine the gypsum in the preferred fiberboard compositions of this invention. One particularly useful resin emulsion, which is suitable for use as the resin polymer of the preferred fiberboard composition and as an adhesive for bonding the various fire door and fire panel elements to one another is UCAR-130 poly-(vinyl acetate) polymer by Union Carbide.

The composition for preparing the fiberboard layers of this invention will also include water in an amount in vast excess of that required to react with and hydrate the calcined non-fibrous gypsum. That is, at least about, and preferably greater than, a 25-fold excess amount of water should be present. Contrary to the conventional wisdom, the excess water provides processing advantages and leads to products which possess superior properties.

Although the fiberboard compositions of this invention may be formulated in a variety of ways, and any number of different techniques may be employed to produce the panels and boards of this invention, a process which is preferred for making these structures is illustrated diagrammatically in FIG. 1. With reference to FIG. 1, the paper fiber component, e.g., newspaper, together with water, at least about 20 times as much water by weight as paper, are added to pulper 20, and the mixture is reduced to pulp, producing a substantially homogeneous suspension. Glass wool, if it is specified in the composition, can be separately pulped in at least about 20 times its weight of water and the separately pulped wool and paper combined. Alternatively, the paper and glass wool can be pulped together, if desired, in at least about 20 times their combined weight of water. Any textile glass fiber, clay and vermiculite called for are then added to the pulper and thoroughly mixed and incorporated into the suspension. The suspension is then transferred to tank 21.

As needed and required for the composition, pulped suspension from tank 21 is added to mixer 24, any binder polymer from tank 22 as may be required for the composition is added to mixer 24, and sufficient non-fibrous calcium sulfate to yield the requisite amount of dihydrate when reacted with less than about 5% of the water is added from tank 23 to mixer 24, wherein all the components are mixed and incorporated into the suspension, producing a slurry.

The wet slurry 25, sometimes referred to herein as "gypsum stucco", is then cast into mold 26, and the slurry is pressed under hydraulic press 27 for dewatering the slurry and for producing a green casting 28. The pressure employed in the hydraulic press 27 determines the density of the final product; densities in the range of about 40 lbs/ft³ to about 75 lbs/ft³ being readily attained. For the fire-resistant applications of this invention, a density of at least about 60 lbs/ft³, preferably above 65 lbs/ft is preferred.

The green casting is allowed to set and is then conveyed into oven 29 and the set casting is dried. If desired, dried set casting 30 may be sanded at sanding station 31 to the desired thickness and/or then cut to the desired size with saw 32. It will be evident that the aforesaid steps can be adapted to either a batch or continuous process.

In the preferred continuous process for manufacturing boards and panels within the scope of the present invention, the aforementioned aqueous dispersion of constituents is formed into a sheet of indefinite length by the use of standard paper-making techniques. For example, the aqueous dispersion of constituents can be fed from a head box of the type associated with a paper-making machine to a foraminous moving belt through which water drains as the mass of solids coagulates and sets. The resulting composite sheet is consolidated by passing through press rolls. Heated rollers can also be used to dry the sheet.

The processes of the present invention can be used to make an unsupported (unfaced) fiberboard which has a substantially uniform and homogeneous composition throughout its thickness. The term "unfaced" is used herein to mean that the fiberboard is preferably not faced with a sheet material, for example, the paper or glass fiber mat that is often used as a facing material for gypsum wallboard.

As mentioned above, it is preferred that the fiberboard layers of the present invention have a density of at least about 60 lbs/ft³, but it will be understood that the material can have a density of as low as 40 lbs/ft³ for some applications. In order to achieve flexural strength and screw-holding capacity having the values referred to above (30 lbs and 400 lbs respectively) in building materials having densities below 60 lbs/ft³, there should be included in the composition from which the building material is made relatively high amounts of binder polymer, for example, about 25 wt. % to about 35 wt. % based on solids content. For applications in which such flexural strength characteristics and screw-holding capacity are not considered important, the use of such binder polymer can be absent or provided in smaller amounts. The density of the fiberboard can be controlled by the use of pressure in forming the product and/or by the use of a low-density material, for example, expanded perlite.

Table I presents data obtained in producing building materials using the aforesaid batch process and various cellulosic fibers. All samples were pressed at 300 psi in a 4 inch by 4 inch mold. Samples were removed from the mold after pressing, hydrated, and then dried at 110° F. The dried samples were sanded to about 0.3 inches thick, cut to 1 inch wide by 4 inches long and tested for flexural strength on 3 inch centers. As reported in Table I below, the various cellulosic fibers used in forming the fiberboard panels comprise either wood chips which are pulped (comparative example) or paper stock which is pulped, the paper stock comprising either newspaper, Kraft paper, sulfite paper or paper of the type used to face wallboard. The significant improvements achieved by using the pulp of paper stock relative to the use of wood pulp are evident from the results reported in Table I.

TABLE I

Fiberboard Cellulosic Fiber Source Sample Data

| | Cellulosic Fiber | | | | |
|---|---|---|---|---|---|
| | News-paper | Kraft | Wood Pulp | Sulfite | Wall-board |
| Weight of Water (g) | 500.0 | 500.0 | 500.0 | 500.0 | 500.0 |
| Weight of fiber material (g) | 20.0 | 20.0 | 20.0 | 20.0 | 20.0 |
| Time to vortex (sec) | 24.0 | 291.0 | 0.0 | 191.0 | 377.0 |
| Weight of Pulp Solution (g) | 508.9 | 505.6 | 512.3 | 512.7 | 511.3 |
| Weight of Gypsum (g) | 113.0 | 113.0 | 113.0 | 113.0 | 113.0 |
| Weight in mold prior to press (g) | 616.0 | 611.7 | 620.3 | 618.2 | 614.5 |
| Water/gypsum off before press (g) | 267.5 | 265.7 | 383.9 | 273.2 | 289.0 |
| Water/gypsum off during press (g) | 159.7 | 158.7 | 98.7 | 142.6 | 137.3 |
| Gypsum lost before press (g) | 2.82 | 5.47 | 36.59 | 5.07 | 1.33 |
| Gypsum lost during press (g) | 0.61 | 0.73 | 4.02 | 0.74 | 0.3 |
| Total water lost during press (g) | 423.77 | 418.2 | 441.99 | 409.99 | 424.67 |
| Weight of sample-wet (g) | 180.98 | 179.7 | 126.7 | 177.28 | 183.12 |
| Weight of sample-dry (g) | 137.74 | 134.41 | 84.78 | 134.71 | 139.52 |
| Water lost during drying (g) | 43.24 | 45.29 | 41.92 | 42.57 | 43.6 |
| % mixture actually in sample | 97.3 | 96.6 | 98.0 | 97.7 | 97.1 |
| % total water lost before drying | 87.8 | 87.9 | 98.5 | 85.1 | 87.8 |
| % total gypsum lost before drying | 0.031 | 0.057 | 36.7 | 0.053 | 0.015 |
| Weight of 1" sample | 25.4 | 24.92 | 15.59 | 26.66 | 24.52 |

TABLE I-continued

| Fiberboard Cellulosic Fiber Source Sample Data | | | | |
|---|---|---|---|---|
| | Cellulosic Fiber | | | |
| | News-paper | Kraft | Wood Pulp | Sulfite | Wall-board |
| (g) | | | | | |
| Caliper of 1" sample (in) | 0.318 | 0.321 | 0.314 | 0.322 | 0.319 |
| Density of 1" sample (lbs/in$^3$) | 73.187 | 71.731 | 46.352 | 76.52 | 70.498 |
| Flexural strength (lbs) | 40.44 | 45.3 | 1.05 | 50.23 | 29.67 |

Figure 2:
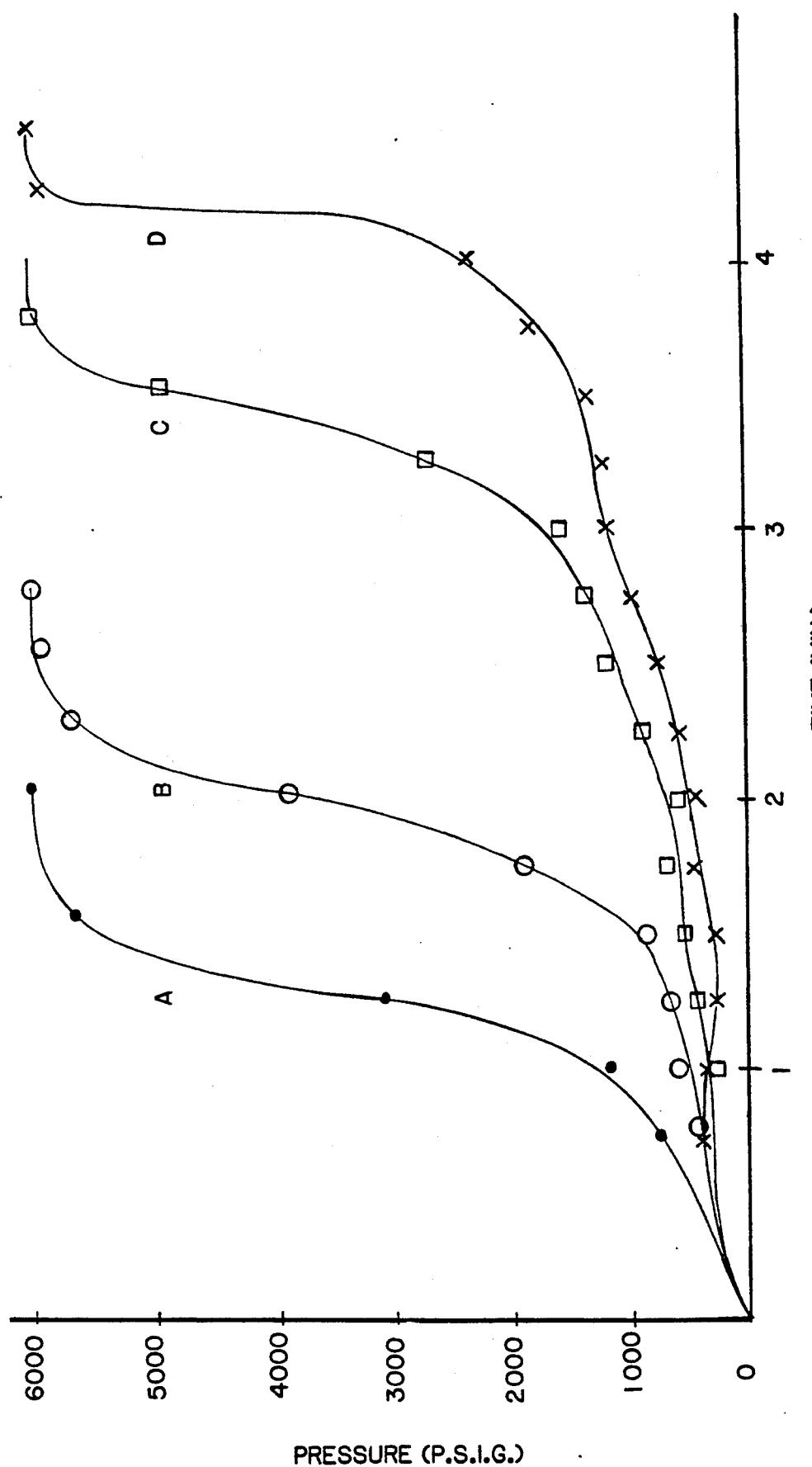
FIG. 2: is a graphical illustration of the effect of one of the components in a preferred fiberboard composition of this invention one of the processing steps.

In contrast to that which has been taught previously in the gypsum arts, such as in U.S. Pat. No. 4,557,973, it is not necessary in the process described above to pretreat the glass wool with powdered gypsum prior to its use. Furthermore, the presence of the vast excess amount of water permits the gypsum slurry to flow out in the mold to a uniform thickness. In pressing the slurry to produce the green casting, care is required in order to prevent geysering, in which streams of slurry suddenly exit the mold with a great deal of force. This can be avoided by applying pressure slowly to the slurry. The amount of binder polymer in the slurry has an effect on the press time as shown in FIG. 2. The data shown in FIG. 2 were obtained from casting compositions of this invention prepared as set forth in Fiberboard Example 1.

FIBERBOARD EXAMPLE 1

Four casting compositions were prepared containing the following ingredients in parts by weight:

TABLE II

| | Fiberboard Compositions with Varying Polymer Binder Concentrations | | | |
|---|---|---|---|---|
| Ingredient | A | B | C | C |
| gypsum hemihydrate | 113 | 113 | 113 | 113 |
| newspaper | 20 | 20 | 20 | 20 |
| polymer binder$^a$ | 0 | 2.2 | 4.4 | 8.7 |
| water | 500 | 500 | 500 | 500 |

$^a$Polyvinyl acetate (UCAR-130)

Figure 3:
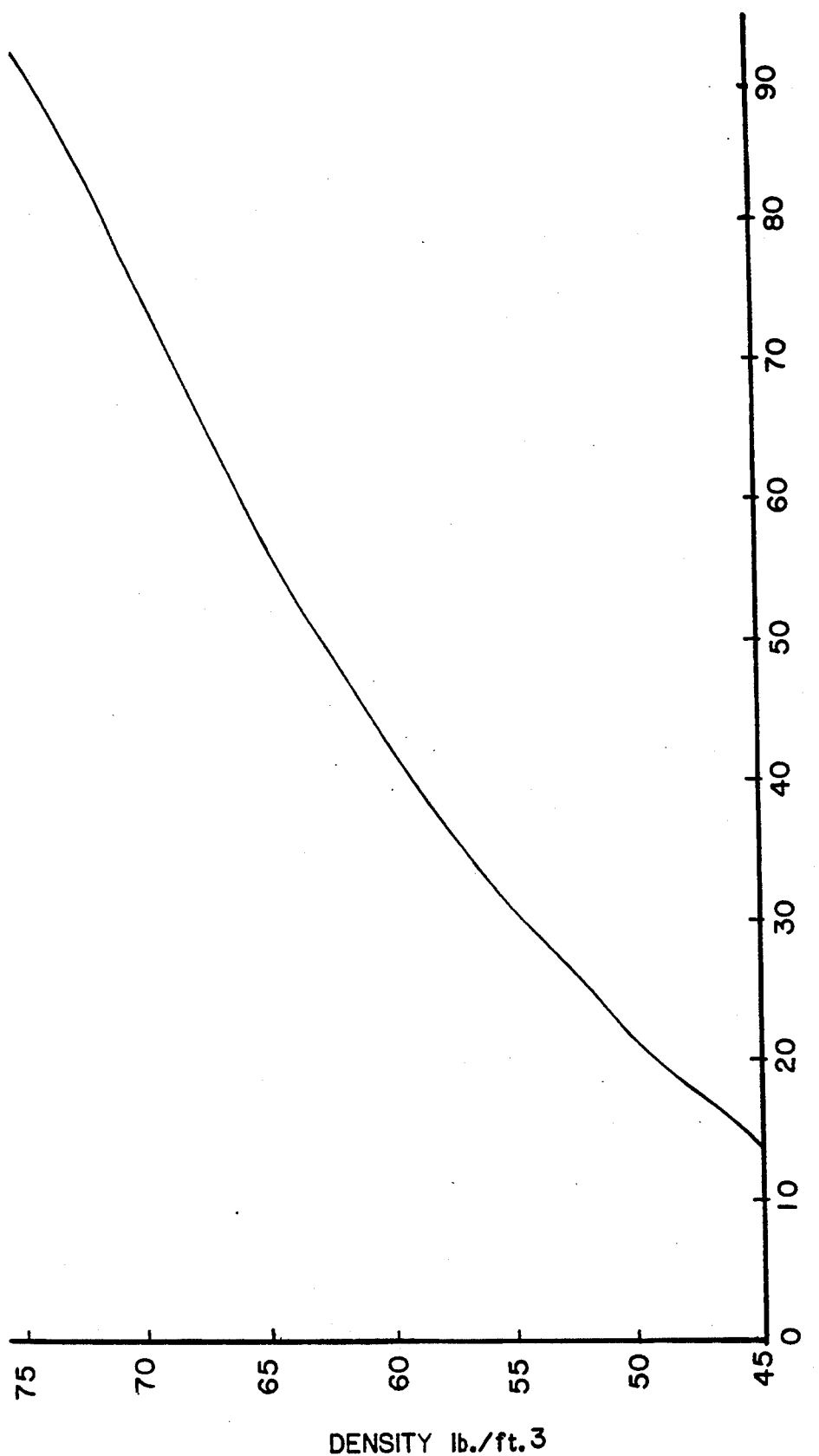
FIG. 3: is a graphical illustration of the flexural strength of fiberboards of this invention as a function of the density of the material.

The newspaper was pulped in a Waring blender; the gypsum and polymer binder were added, and the blended mixture was pressed into ¾ inch thick slabs at a rate to avoid geysering. Building materials within the scope of this invention, prepared by the process described hereinabove, were tested for flexural strength, as defined by the following procedure. These tests generally employed ASTM Method C 473-86a modified in that the specimens were ½ inch thick, 1 inch wide, and 4 inches long, with random orientation. In each case, the specimen was supported on bearings 3 inches apart, and the specimen was broken across the 1 inch width. Evaluation of flexural strength as a function of the density of fiberboards was undertaken, and the results appear in FIG. 3. The flexural strength of fiberboards within the scope of this invention generally should be at least about 30 lbs, preferably at least about 60 lbs (½ inch thick sample).

Figure 4:
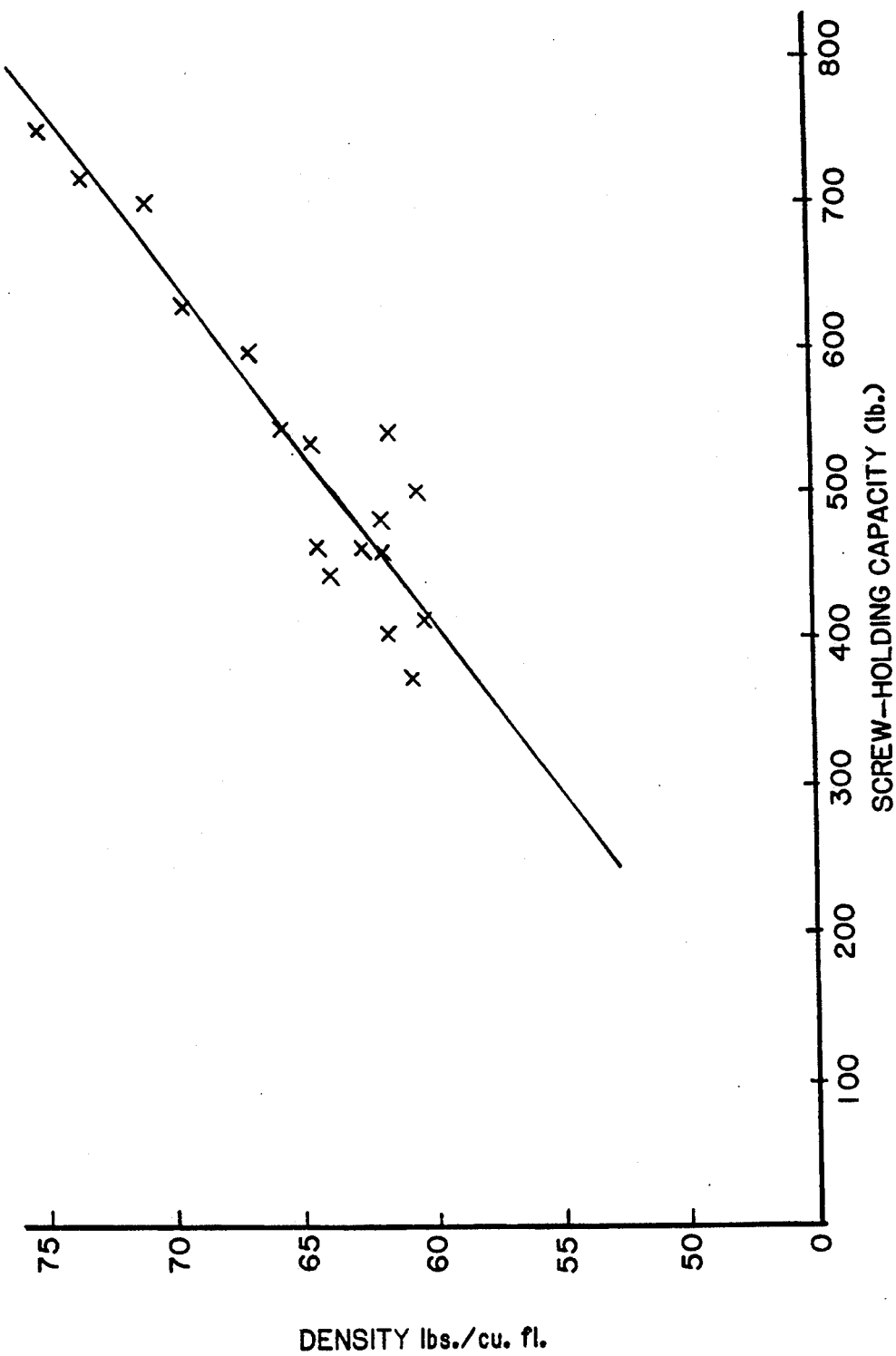
FIG. 4: is a graphical illustration of the screw-holding capacity of fiberboards of this invention as a function of the density of the material.

Fiberboards within the scope of this invention were evaluated for screw-holding capacity, as defined by the following procedure. In these tests, a specimen of material to be tested, dried to constant weight and ½ inch +/−1/32 inch thick, at least 9 inches long, and nominally 1 9/16 inches wide, was employed. At midwidth, a 5/32 inch pilot hole was drilled to receive a No. 12 sheet metal screw. With the specimen supported on a wooden block or steel plate and the pilot hole centered over a ⅜ inch hole in the support, the screw was turned until the full shank thickness penetrated the specimen. Force was then applied vertically at the center of the screw, forcing the screw through the specimen, and the force was noted. Evaluation of the screw-holding capacity of fiberboards within the scope of this invention was undertaken, as set forth in Fiberboard Example 2. The results appear in FIG. 4. In general, the screw-holding capacity of a building material within the scope of this invention should be at least about 400 lbs, and in a building board to be used as fire door edge banding, the screw-holding capacity should preferably be at least about 600 lbs, more preferably in excess of about 700 lbs.

FIBERBOARD EXAMPLE 2

A casting composition was prepared containing the following ingredients in parts by weight:

TABLE III

| Base Casting Composition | |
|---|---|
| Ingredient | Quantity |
| gypsum hemihydrate | 113 |
| newspaper | 20 |
| water | 500 |

The newspaper was pulped in a Waring blender; the gypsum was added, and varying amounts of the blended mixture were added to a mold and pressed to ½ inch thick slabs. After curing and drying, the density and screw-holding capacity of each slab was measured.

The screw-holding capacity of the fiberboards of this invention is enhanced through the use of binder polymer as illustrated in Fiberboard Example 3.

FIBERBOARD EXAMPLE 3

In each case, the casting composition included 113 g calcined non-fibrous gypsum, 20 g paper, 2.2 g glass textile fiber, and 5 g binder polymer.

TABLE IV

| Physical Properties of Various Fiberboards Per Binder Polymer Type | | |
|---|---|---|
| Binder Polymer | Product Density lbs/ft$^3$ | Screw-Holding Capacity lbs |
| AIRFLEX 4530$^a$ | 67.5 | 749 |
| 4500 | 65.8 | 670 |
| 7522 | 68.6 | 730 |
| 4514 | 68.8 | 689 |
| UCAR-130$^b$ | 66.6 | 890 |
| GEN FLO 6500$^c$ | 68.9 | 718 |
| UCAR-376$^d$ | 71.6 | 678 |
| UCAR-417$^e$ | 66.7 | 650 |

$^a$The AIRFLEX products are all ethylene/vinyl chloride
$^b$Polyvinyl acetate homopolymer
$^c$Styrene/butadiene
$^d$Vinyl/acrylic
$^e$Acrylic

FIRE DOOR CONSTRUCTION

Referring now to FIGS. 5-8, there is shown a solid fire-resistant door structure which includes a 90 minute ASTM E-152 fire test label. This door, shown in both "flush" and "panel" configurations, preferably contains a gypsum fiberboard core having a thickness of about 1.5 inches. The core can contain one or more layers of fiberboard panels of the previously described composition, but preferably includes three ½ inch fiberboard panels adhered together with adhesive.

Figure 5:
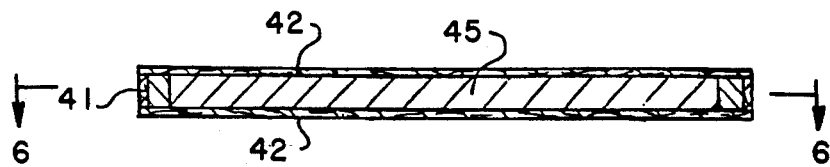
FIG. 5: is a top view of one of the preferred fire doors of this invention.
Figure 6:
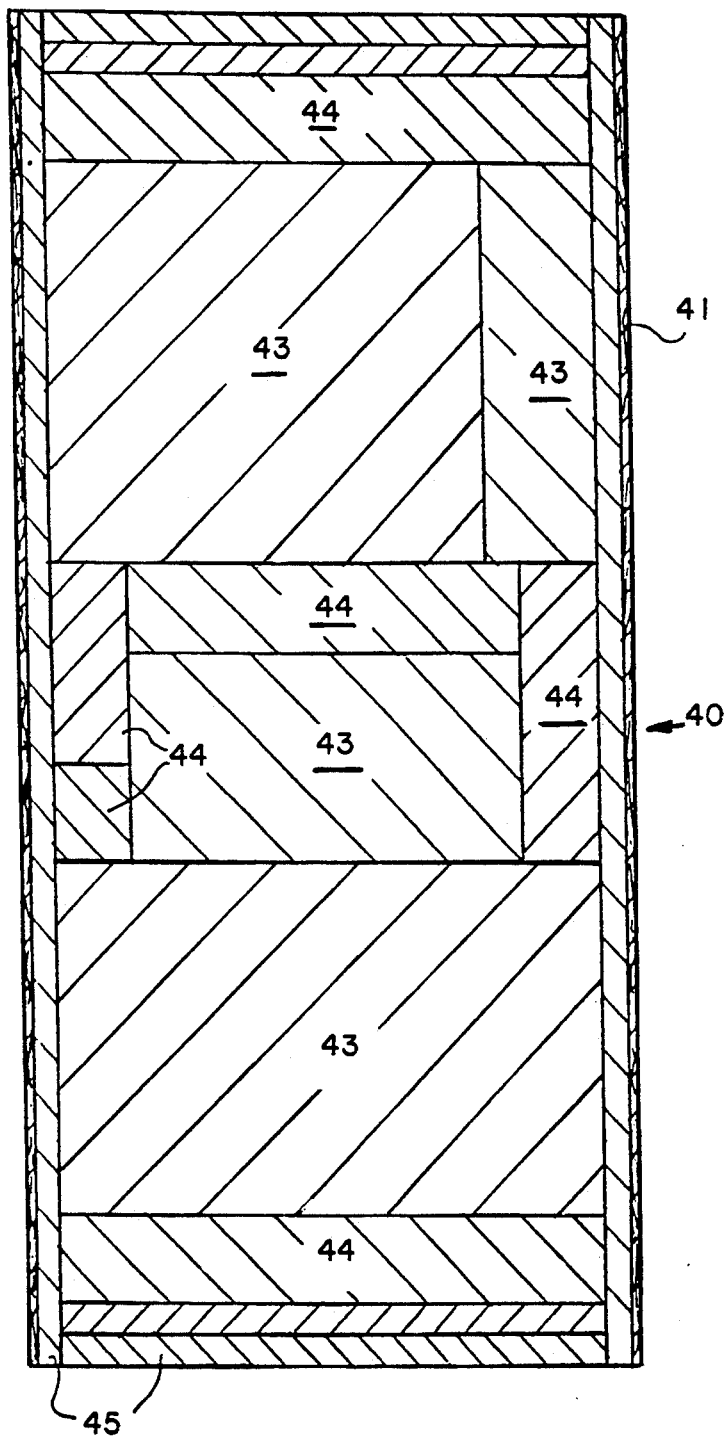
FIG. 6: is a front cross-sectional view taken along line 6—6 of the fire door of FIG. 5.

With reference to FIGS. 5 and 6, there is shown in top and front cross-sectional views, a solid fire door construction 40 employing a solid multi-section, fiberboard core. This fire door 40 is preferably about 4 feet wide and 8 feet high, and includes a gypsum fiberboard core having a density of at least about 60 lbs/ft and a composition containing about 65 wt. % to about 90 wt. % set gypsum dihydrate and about 7 wt. % to about 30 wt. % paper fiber. The fiberboard core of fire door 40, can include multi-ply fiberboard sections 43, which can be adhered along their side edges to provide a complete core with other structural members. The fiberboard compositions can also be employed in both the edge banding 45 used to support the latch mechanism and to provide structural support to the edge of the door, for example the fiberboard vertical stiles and horizontal rails in FIG. 6 (note, that the rails are depicted as two fiberboard members adhered along their longitudinal length), blocking 44 used to provide further support for a latch as well as the door knob and other hardware. The door facings 42 are preferably made of birch or plywood veneer, ⅛ inch thick, and natural fir strips 41 are preferably adhesively bonded to the stiles.

Figure 7:
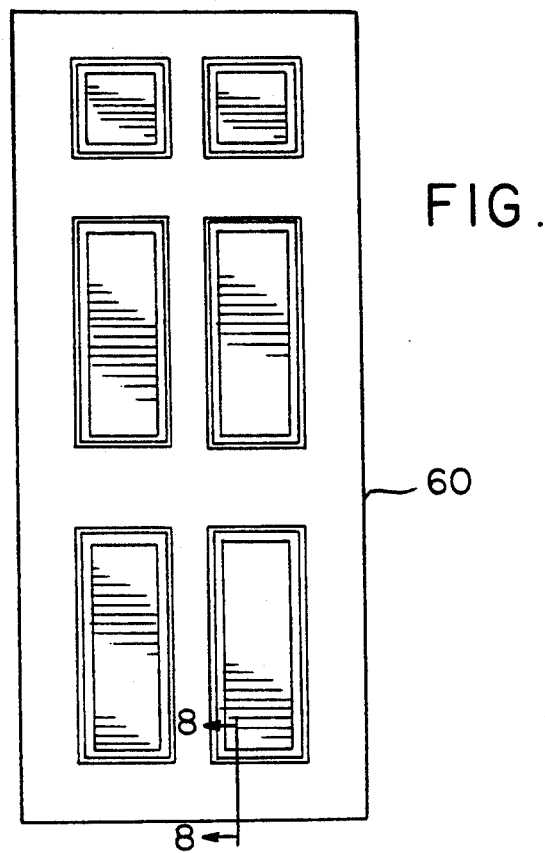
FIG. 7: is a front planar view of a standard design, 6-panel door embodiment having relief areas machined into a preferred gypsum fiberboard.
Figure 8:
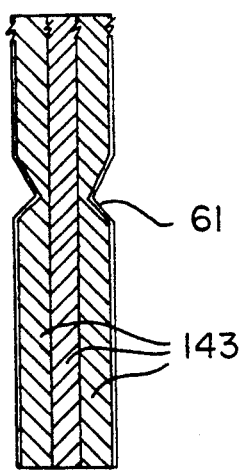
FIG. 8: is a cross-sectional view, taken through line 8—8 of the design 6-panel door embodiment of FIG. 7.

With respect to FIGS. 7 and 8, an alternative solid fiberboard fire door structure, panel door 60, can be constructed using art recognized machining and construction skills, such as a computer-controlled router. In this fire door embodiment 60, designs 61 are preferably machined directly into the fiberboard panels 143 to provide an attractive appearance.

Figure 13:
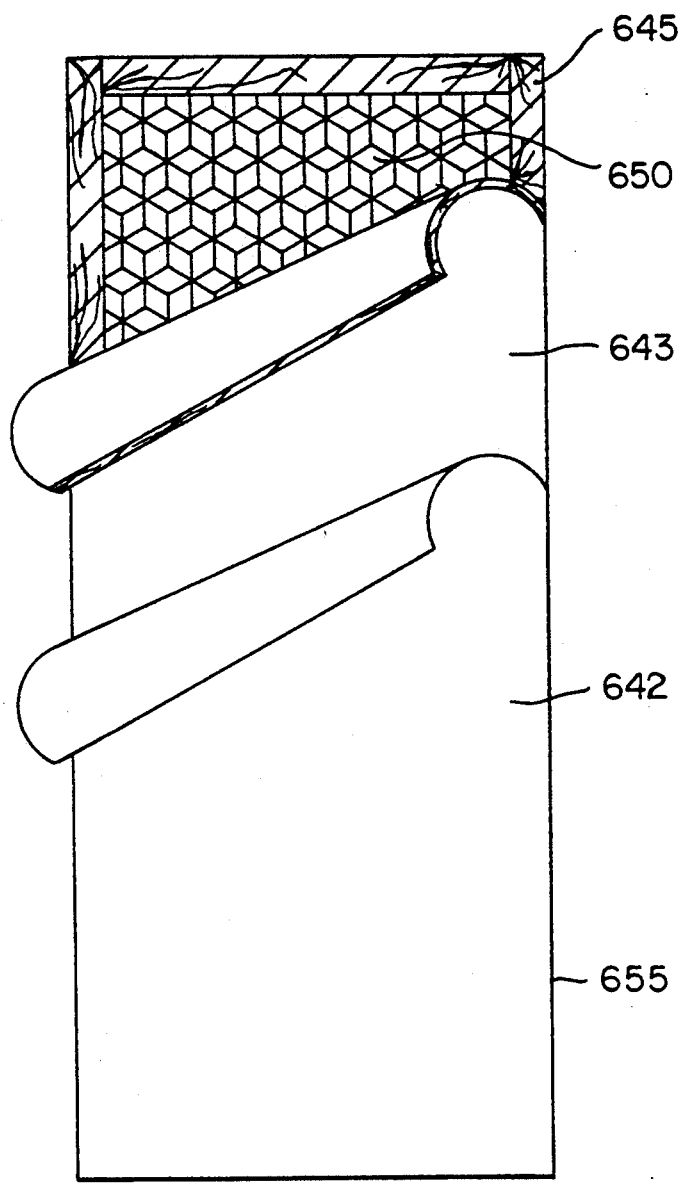
FIG. 13: is a front planar view of a 60 minute fire door embodiment of this invention illustrating peel-away views of a wood-like veneer layer, gypsum fiberboard layer, paper-containing honeycomb-like layer, and gypsum fiberboard edge banding.

Referring now to FIG. 13, there is shown a lightweight fire door construction 655 having at least a 20 minute ASTM E-152 fire test rating, which includes a honeycomb-like structure 650, for example, cardboard honeycomb or plastic foam spacer sheets such as those described in Lehnert and , Fowler, U.S. Pat. No. 4,811,538, Col. 4, which patent is hereby incorporated by reference. The honeycomb-like structure 650 provides a multiplicity of points for supporting a pair of gypsum fiberboard panels 643, only one of which is illustrated; the other being adhered to the reverse planar side of the honeycomb, such as depicted in FIG. 9. The panels 643 preferably comprise a composition having a density of at least about 60 lbs/ft$^3$, a flexural strength of at least about 30 lbs, and preferably at least about 40 lbs (½ inch thick material), and a screw-holding capacity of at least about 400 lbs. The composition of the panels 643 contains a substantially uniform distribution of solids including about 65 wt. % to about 90 wt. % set gypsum dihydrate, about 7 wt. % to about 30 wt. % paper fiber, and about 1.5 wt. % to about 35 wt. % of one or more performance boosters selected from inorganic fiber, clay, vermiculite, and binder polymer. In this embodiment, a pair of facings, only one of which is illustrated; the other being adhered to the opposite facing fiberboard panel, such as depicted in FIG. 9, preferably ⅛ inch thick plywood skins 642, are adhered to the gypsum fiberboard panels 643 to provide an aesthetically appealing surface which can be stained or painted to match or blend with interior furnishings or exterior surface treatments.

The honeycomb-like structure 650 of the preferred light-weight door construction 655 is desirably enclosed around its perimeter with gypsum fiberboard edge banding 645. Although the edge banding 645 can include the same composition as the gypsum fiberboard panels 643, it preferably comprises about 68 wt. % to about 78 wt. % set gypsum dihydrate, about 10 wt. % to about 17 wt. % paper fiber, up to 35 wt. % binder polymer, up to 7 wt. % inorganic fiber, up to 6 wt. % clay, and up to 6 wt. % vermiculite. The preferred edge banding 645 includes a density of at least about 65 lbs/ft$^3$ and a screw-holding capacity of at least about 600 lbs, although densities of up to and exceeding 70 lbs/ft$^3$ and screw-holding capacities in excess of 700 lbs are also suitable for this purpose.

The sheets of wood-like material 642, also referred to as "veneer" or "facing sheets", are preferably made of thin wood sheets, thin hardboard or plywood having a thickness of approximately ⅛ inch or less. Other sheets of thin material could also be employed for these members, such as metal, or polymers, especially fiber reinforced plastics.

Referring now to FIG. 9, an ASTM E-152, 2 minute veneer-faced, fire door can be prepared as follows A pair of 3/16 inch gypsum fiberboard panels 243 having a composition comprising approximately 76.25 wt. % gypsum stucco 0.55 wt. % ½ inch long fiberglass, 12.3 wt. % paper pulped fibers, and 10.9 wt. % ASP clay can be adhered to a paper honeycomb core 250 using UCAR-130 resin A ⅛ inch plywood veneer 242 can then be adhered with adhesive 247 to the outer surfaces of the fiberboard panels 243 and edge banding 245 can be inserted around the periphery of the door as illustrated. The edge banding 245 preferably consists of Georgia-Pacific Corporation's FIRESTOP composition including 80.12 wt. % gypsum stucco, 1.6 wt. % ½ inch long fiberglass, 14.24 wt. % paper pulped fibers, 1.84 wt. % UCAR-130 resin, and 2.20 wt. % unexpanded vermiculite.

Referring now to FIG. 10, an ASTM E-152, 45 minute veneer-faced, fire door can be prepared as follows A pair of ⅜ inch gypsum fiberboard panels 343 having a composition comprising approximately 76.25 wt. % gypsum stucco, 0.55 wt. % ½ inch long fiberglass, 12.3 wt. % paper pulped fibers, and 10.9 wt. % ASP clay can be adhered to a paper honeycomb core 350 using UCAR-130 resin. A ⅛ inch plywood veneer 342 can then be adhered with adhesive 347 to the outer surfaces of the fiberboard panels 343 and edge banding 345 can be inserted around the periphery of the door as illustrated. The edge banding 345 preferably consists of Georgia-Pacific Corporation's FIRESTOP composition including 80.12 wt. % gypsum stucco, 1.6 wt. % ½ inch long fiberglass, 14.24 wt. % paper pulped fibers, 1.84 wt. % UCAR-130 resin, and 2.20 wt. % unexpanded vermiculite.

Referring now to FIG. 11, an ASTM E-152, 60 minute Veneer-faced, fire door can be prepared as follows. A pair of ½ inch gypsum fiberboard panels 443 having a composition comprising approximately 78.57 wt. % gypsum stucco, 0.63 wt. % ½ inch long fiberglass, 12.82 wt. % paper pulped fibers, 6.4 wt. % unexpanded vermiculite, and 1.56 wt. % pulped glass wool, can be adhered to a paper honeycomb core 450 using UCAR-130 resin A ⅛ inch plywood veneer 442 can then be adhered with adhesive 447 to the outer surfaces of the fiberboard panels 443 and edge banding 445 can be inserted around the periphery of the door as illustrated. The edge banding 445 preferably consists of Georgia-Pacific Corporation's FIRESTOP composition including 80.12 wt. % gypsum stucco, 1.6 wt. % ½ inch long fiberglass, 14.24 wt. % paper pulped fibers, 1.84 wt. % UCAR-130 resin, and 2.20 wt. % unexpanded vermiculite.

Referring now to FIG. 12, an ASTM E-152, 90 minute, veneer-faced, fire door can be prepared as follows. Three ½ inch gypsum fiberboard panels 543 having a composition comprising approximately 78.57 wt. % gypsum stucco 0.63 wt. % ½ inch long fiberglass, 12.82 wt. % paper pulped fibers, 6.4 wt. % unexpanded vermiculite, and 1.56 wt. % pulped glass wool, can be adhered together using UCAR-130 resin to produce a core. A ⅛ inch plywood veneer 542 can then be adhered with adhesive 547 to the outer surfaces of the fiberboard panels 543 and edge banding 545 can be inserted around the periphery of the door as illustrated. The edge banding, if one is applied, preferably consists of Georgia-Pacific Corporation's FIRESTOP composition including 80.12 wt. % gypsum stucco, 1.6 wt % ½ inch long fiberglass, 14.24 wt. % paper pulped fibers, 1.84 wt. % UCAR-130 resin, and 2.20 wt. % unexpanded vermiculite. Such a door was prepared and successfully passed a 90 minute ASTM E-152 test. It can be understood that the inherent properties of the fiberboard panels 543 of this embodiment could be relied upon for mounting door hardware, without using a separate edge banding system.

Unfaced fire doors can be constructed with ASTM E-152, 20, 45, 60, and 90 minute ratings by substituting the panels 43, 143, 243, 343, 443, and 543 in the above examples with gypsum fiberboard panels having a composition comprising approximately 77.88 wt. % gypsum stucco, 0.7 wt. % ½ inch long fiberglass, 9.0 wt. % paper pulped fibers, 3.4 wt. % UCAR 130 resin (wet), and 9.02 wt. % ASP clay which are adhered using UCAR-130 resin to a paper honeycomb core, or in the case of a 90 minute door, a third ½ inch panel. The additional resin in this formulation provides a strong, smooth, scuff-resistant surface and eliminates a need for a plywood veneer-facing. Edge banding can be inserted around the periphery of these doors and preferably consists of Georgia-Pacific Corporation's FIRESTOP composition including 80.12 wt. % gypsum stucco, 1.6 wt. % ½ inch long fiberglass, 14.24 wt. % paper pulped fibers, 1.84 wt. % UCAR-130 (wet) resin, and 2.20 wt. % unexpanded vermiculite. The 20 minute (3/16 inch gypsum fiberboard panels, paper honeycomb, and edge banding) and 60 minute (¼ inch gypsum fiberboards panels, paper honeycomb, and edge banding) versions of these unfaced doors were successfully tested per ASTM E-152.

It will be understood, upon inspection of the disclosed fiberboard embodiments, that clay additions will vary depending upon the thickness of the fiberboard used. Clay is also important for obtaining "stand alone" qualities, i.e., the ability of the fiberboard to stand upright after fire has consumed the honeycomb core. These features are important for thicknesses of fiberboards less than about ½ inches. (For example, thinner panels, such as those employed herein for ⅛ inch skins, 3/16 inch, and ⅜ inch panels require more clay for resistance to structural cracking, which is partially caused by thermal and pressure changes during fire testing.) While it is known that clay reduces shrinkage, see Green, U.S. Pat. No. 3,616,173, which is hereby incorporated by reference, it also seems to provide a more rigid panel that resists flexing during handling. This resistance to flexing becomes critical during a fire test, as the paper honeycomb burns away, requiring the panels to stand alone over about a 36 inch span, the width of a standard size door. For thin panels, for example, less than about ⅜ inches, the fiberboard composition should contain about 5–15 wt. % clay, and preferably about 9–11 wt. % clay.

COMPARATIVE FIRE TESTING EXAMPLES

As a further demonstration of the effectiveness of the fiberboard compositions of this invention, three different fire doors were tested pursuant to ASTM E-152 with temperature readings being made on the unexposed faces at selected time intervals.

The first test door contained a Georgia-Pacific mineral core of the type disclosed in U.S. Pat. No. 4,343,127, hereby incorporated by reference, comprising compressed perlite covered with a wood skin. The second door included the same perlite-core, but the wood skin was replaced with ⅛ inch gypsum fiberboard skins containing 77.88 wt. % gypsum stucco, 0.7 wt. % ½ inch long fiberglass, 9.0 wt. % paper pulped fibers, 3.4 wt. % UCAR 130 resin (wet), and 9.02 wt. % ASP clay. In a third door construction, a gypsum fiberboard core was constructed with three ½ inch gypsum fiberboard panels containing 80.12 wt. % gypsum stucco, 1.6 wt % ½ inch long fiberglass, 14.24 wt. % paper pulped fibers, 1.84 wt. % unexpanded vermiculite, and 2.20 wt. % pulped glass wool.

Table V illustrates the temperature of the unexposed faces of these doors during the fire test. As used in this Table, the symbol "T" refers to the temperature difference between the unexposed face of the referenced door and the unexposed face of the Perlite Core Woodskin door, at the same Furnace temperature.

TABLE V
Fire Test Results in Degrees °F.

| Time Minutes | Furnace Temperature | Perlite Core Woodskin Unexposed Face | Perlite Core Gypsum Fiberboard Skin Unexposed Face | Gypsum Fiberboard Core Woodskin Unexposed Face (Temperature recorded at 15 min intervals only) |
|---|---|---|---|---|
| 0  | Ambient | 79°  | 70°  | 84°  |
| 5  | 1000°   | 80°  | 72°  |      |
| 10 | 1300°   | 102° | 90°  |      |
| 15 | 1399°   | 156° | 134° | 101° |
| 20 | 1462°   | 192° | 149° |      |
| 25 | 1510°   | 203° | 150° |      |
| 30 | 1550°   | 214° | 159° | 137° |
| 35 | 1584°   | 251° | 162° |      |
| 40 | 1613°   | 326° | 179° |      |
| 45 | 1638°   | 422° | 220° | 170° |
| 50 | 1661°   | 422° | 219° |      |
| 55 | 1681°   | 411° | 223° |      |
| 60 | 1700°   | 420° | 239° ΔT 181° | 184° |
| 65 | 1718°   | 430° |      |      |
| 70 | 1735°   | 439° |      |      |
| 75 | 1750°   | 446° |      | 185° |
| 80 | 1765°   | 458° |      |      |
| 85 | 1779°   | 465° |      |      |
| 90 | 1792°   | 472° |      | 194° ΔT 278° |

As the data demonstrates, a ⅛ inch gypsum fiberboard skin applied to each side of a standard commercial fire door, during a standard 1 hour fire test, produced up to a 200° F. lower temperature on the unexposed face when compared to a wood skin-perlite core commercial door. This temperature gap was further increased when a gypsum fiberboard core was used instead of a perlite core; the temperature of the door having a gypsum fiberboard core had a 278° F. lower temperature at a furnace temperature of 1792° F. than did the perlite core commercial door.

From the foregoing, it can be realized that this invention provides fire-resistant panels and doors which can be used in combination with known fire door elements to provide various constructions, as needed, for different fire ratings at minimal cost. The fiberboard panels of this invention are stable through a wide range of humidities, require less adhesive, require no additional edge system, are machinable into contoured configurations, and cost less to manufacture than gypsum wallboard. The outlined combination of physical properties and materials, when applied to fire door manufacturing, opens up new frontiers of opportunities in door costs and construction designs. Although various embodiments have been illustrated, this was for the purpose of describing and not limiting the invention. Various modifications, which will become apparent to one skilled in the art, are within the scope of this invention described in the attached claims.

LIST OF REFERENCE MERLS

20—Pulper
21—Tank
22—Tank
23—Tank
24—Mixer
25—Wet Slurry
26—Mold
27—Hydraulic Press
28—Green Casting
29—Oven
30—Set Casting
31—Sanding Station
32—Saw
40—Solid Fire Door Construction
41—Natural Fir Strips
42, 242, 342, 442, 542, and 642—Door Facings
43, 143, 243, 343, 443, 543, and 643—Fiberboard Panels
44—Blocking
45, 245, 345, 445, 545, and 645—Edge Banding
60—Panel Door
61—Design
247, 347, 447, and 547—Adhesive
250, 350, 450, and 650—Honeycomb-Like Structure
655—Fire Door Construction

We claim:

1. A fire-resistant structure, suitable for use in fire door applications, said structure having at least a 20 minute ASTM E-152 fire test rating, said structure comprising: a core including a gypsum-containing composition having a density of at least about 60 lbs/ft$^3$, a flexural strength of at least about 30 lbs (½ inch thick material), and a screw-holding capacity of at least about 400 lbs, said having a density of at least about 60 lbs/ft$^3$, a flexural strength of at least about 30 lbs (½ inch thick material), and a screw-holding capacity of at least about 400 lbs, said composition containing a substantially uniform distribution of solids including about 65 wt. % to about 90 wt. % set gypsum dihydrate, about 7 wt. % to about 30 wt. % paper fiber, and one or more performance boosters selected from inorganic fiber, clay, vermiculite, and binder polymer.

2. The structure of claim 1, wherein said core comprises a pair of gypsum fiberboard panels comprising said gypsum-containing composition.

3. The structure of claim 2, wherein each of said gypsum fiberboard panels comprises a thickness of at least about 3/16 inch.

4. The structure of claim 3, wherein said core comprises spacing means disposed between said gypsum fiberboard panels for providing a multiplicity of supporting points for supporting said panels.

5. The structure of claim 4, wherein said spacing means comprises a honeycomb-like structure.

6. The structure of claim 5, wherein said honeycomb-like structure comprises paper.

7. The structure of claim 4, wherein said paper fiber comprises about 10 wt. % to about 17 wt. % paper fiber containing recycled scrap paper.

8. The structure of claim 7, wherein said gypsum fiberboard panels are bonded to one another with adhesive means.

9. The structure of claim 4, wherein said composition comprises up to about 15 wt. % binder polymer and about 68 wt. % to about 78 wt. % set gypsum dihydrate.

10. The structure of claim 9, wherein said composition comprises about 1 wt. % to about 3 wt. % binder polymer.

11. The structure of claim 10, wherein said binder polymer comprises at least one of: poly(vinyl acetate), poly acrylate, and poly(vinyl alcohol).

12. The structure of claim 4, wherein said fiberboard panels comprise about 75 wt. % to about 90 wt. % set gypsum dihydrate and about 12 wt. % to about 13 wt. % paper fiber.

13. The structure of claim 4, wherein said fire door comprises gypsum-containing edge banding disposed between said fiberboard panels along at least a portion of their edges.

14. The structure of claim 13, wherein said edge banding consists essentially of said composition.

15. The structure of claim 13, wherein said edge banding comprises about 68 wt. % to about 78 wt. % set gypsum dihydrate, about 10 wt. % to about 17 wt. % paper fiber, up to about 15 wt. % binder polymer, up to about 7 wt. % inorganic fiber, up to about 6 wt. % clay, and up to about 6 wt. % vermiculite, said edge banding having a density of at least about 60 lbs/ft$^3$ and a screw-holding capacity of at least about 600 lbs.

16. The structure of claim 15, wherein said edge banding comprises a density of at least about 65 lbs/ft$^3$ and a screw-holding capacity of at least about 700 lbs.

17. The structure of claim 15, wherein said inorganic fiber comprises up to 7 wt. % glass textile fiber.

18. A fire door having at least a 20 minute ASTM E-152 fire test rating, said door comprising: a core including at least a pair of unfaced gypsum fiberboard panels containing a composition comprising about 75 wt. % to about 90 wt. % gypsum dihydrate, about 10 wt. % to about 17 wt. % paper fiber, and one or more performance boosters selected from inorganic fiber, clay, vermiculite, and binder polymer, said unfaced gypsum fiberboard panels having a flexural strength of at least about 30 lbs (½ inch thick material), a screw-holding capacity of at least about 400 lbs, and a wood-like veneer disposed substantially over said core.

19. The fire door of claim 18, wherein said gypsum fiberboard panels comprise about 12 wt. % to about 13 wt. % paper fiber and about 0.8 wt. % to about 2 wt. % siliceous fiber.

20. The fire door of claim 18, wherein said gypsum fiberboard panels comprise up to 6 wt. % clay, up to 6 wt. % vermiculite, and up to 15 wt. % binder polymer.

21. The fire door of claim 19, wherein said siliceous fiber comprises up to about 0.4 wt. % chopped glass textile fiber and about 0.5 wt. % to about 1.5 wt. % glass wool.

22. The fire door of claim 20, wherein said binder polymer comprises one or more of: poly(vinyl acetate), poly acrylate, and poly(vinyl alcohol).

23. The fire door of claim 18, further comprising a paper honeycomb-like layer disposed between said gypsum fiberboard panels.

24. A fire door having at least a 45 minute ASTM E-152 fire test rating, said door comprising:
(a) a core including at least a pair of gypsum-containing fiberboard panels having a combined thickness of greater than about ¾ inches, said fiberboard panels having a density of at least about 60 lbs/ft³ and including a composition containing about 65 wt. % to about 90 wt. % set gypsum dihydrate and about 7 wt. % to about 30 wt. % paper fiber; and
(b) a paper-containing honeycomb-like structure disposed between said fiberboard panels.

25. The fire door of claim 24, wherein said composition comprises about 75 wt. % to about 90 wt. % set gypsum dihydrate and about 12 wt. % to about 13 wt. % paper fiber, said composition having a flexural strength of at least about 30 lbs (½ inch thick material) and a screw-holding capacity of at least about 400 lbs.

26. The fire door of claim 25, wherein said composition further includes about 0.8 wt. % to about 2.0 wt. % siliceous fiber, up to 6 wt. % clay, up to 6 wt. % vermiculite, and up to about 15 wt. % binder polymer.

27. The fire door of claim 26, further comprising edge banding disposed between said gypsum fiberboard panels along at least a portion of their edges, said edge banding comprising about 68 wt. % to about 78 wt. % set gypsum dihydrate, about 10 wt. % to about 17 wt. % paper fiber, up to about 15 wt. % binder polymer, up to about 7 wt. % inorganic fiber, up to about 6 wt. % clay, and up to about 6 wt. % vermiculite, said edge banding having a density of at least about 65 lbs/ft³ and a screw-holding capacity of at least about 600 lbs.

28. A fire door having at least a 60 minute ASTM E-152 fire test rating, said door comprising:
(a) a core including at least a pair of gypsum-containing fiberboard panels having a combined thickness of greater than about 1 inch, said fiberboard panels having a density of at least about 60 lbs/ft³ and including a composition containing about 65 wt. % to about 90 wt. % set gypsum dihydrate and about 7 wt. % to about 30 wt. % paper fiber, said panels having a screw holding capacity of at least about 400 lbs. and a flexural strength of at least about 30 lbs. (½ thick material); and
(b) a paper-containing honeycomb-like structure disposed between said fiberboard panels.

29. The fire door of claim 28, wherein said composition comprises about 75 wt. % to about 90 wt. % set gypsum dihydrate and about 12 wt. % to about 13 wt. % paper fiber.

30. The fire door of claim 29, wherein said composition further includes about 0.8 wt. % to about 2.0 wt. % siliceous fiber, up to 6 wt. % clay, up to 6 wt. % vermiculite, and up to about 15 wt. % binder polymer.

31. The fire door of claim 30, further comprising edge bending disposed between said gypsum fiberboard panels along at least a portion of their edges, said edge banding comprising about 68 wt. % to about 78 wt. % set gypsum dihydrate, about 10 wt. % to about 17 wt. % paper fiber, up to about 15 wt. % binder polymer, up to about 7 wt. % inorganic fiber, up to about 6 wt. % clay, and up to about 6 wt. % vermiculate, said edge banding having a density of at least about 65 lbs/ft³ and a screw-holding capacity of at least about 600 lbs.

32. A fire door having at least a 90 minute ASTM E-152 fire test rating, said door comprising:
(a) a core comprising a fiberboard layer having a thickness of greater than about 1.5 inches, said fiberboard layer having a density of at least about 60 lbs/ft³ and including a composition containing about 65 wt. % to about 90 wt. % set gypsum dihydrate and about 7 wt. % to about 30 wt. % paper fiber, said layer having a screw holding capacity of at least about 400 lbs. and a flexural strength of at least about 30 lbs. (½ thick material).

33. The fire door of claim 32, wherein said composition comprises about 75 wt. % to about 90 wt. % set gypsum dihydrate and about 12 wt. % to about 13 wt. % paper fiber.

34. The fire door of claim 33, wherein said composition further includes about 0.8 wt. % to about 2.0 wt. % siliceous fiber, up to 6 wt. % clay, up to 6 wt. % vermiculite, and up to about 15 wt. % binder polymer.

35. The fire door of claim 32, wherein said composition comprises about 68 wt. % to about 78 wt. % set gypsum dihydrate, about 10 wt. % to about 17 wt. % paper fiber, up to about 15 wt. % binder polymer, up to about 7 wt. % inorganic fiber, up to about 6 wt. % clay, and up to about 6 wt. % vermiculite, said fiberboard layer having a density of at least about 65 lbs/ft³ and a screw-holding capacity of at least about 600 lbs.

36. The fire door of claim 32, further comprising up to about a ⅛ inch wood-like veneer disposed substantially over said core.

37. The fire door of claim 32, wherein said fiberboard layer comprises at least a pair of gypsum fiberboards.

38. The fire door of claim 32, wherein said fiberboard layer comprises at least three gypsum fiberboards adhesively bonded together.

39. A fire door having at least a 20 minute ASTM E-152 fire test rating, said door comprising a core including a pair of gypsum wallboards having a paper-containing honeycomb structure disposed therebetween, said core being substantially covered by a gypsum fiberboard veneer having a thickness of up to about ⅛ inches, said veneer having a composition comprising about 65 wt. % to about 90 wt. % set gypsum dihydrate, about 7 wt. % to about 30 wt. % paper fiber, and one or more performance boosters selected from inorganic fiber, clay, vermiculite, and binder polymer, said composition having a screw holding capacity of at least about 400 lbs. and a flexural strength of at least about 30 lbs. (½ inch thick material).

40. The fire door of claim 39, wherein said composition has a flexural strength of at least about 30 lbs (½ inch thick material) and a screw-holding capacity of at least 400 lbs.

41. The fire door of claim 40, wherein said composition has a density of at least about 65 lbs/ft³.

42. A gypsum fiberboard, suitable for firedoor applications, comprising a uniform mixture including about 65-90 wt. % set gypsum dihydrate and about 7-30 wt. % pulped paper fiber, said fiberboard having a flexural strength of at least about 30 lbs. (½ inch thick material) and a screw holding capacity of at least about 400 lbs. and a density within a range of about 40 lbs./ft³ to about 75 lbs./ft³.

* * * * *